(12) United States Patent
Soupal (10) Patent No.: US 8,297,713 B2
(45) Date of Patent: Oct. 30, 2012

(54) FULL FUNCTION TRACTOR PROTECTION VALVE

(75) Inventor: Thomas R. Soupal, Rochester Hill, MI (US)

(73) Assignee: Meritor Wabco Vehicle Control Systems, Troy, MI (US)

( * ) Notice: Subject to any disclaimer, the term of this patent is extended or adjusted under 35 U.S.C. 154(b) by 1158 days.

(21) Appl. No.: 11/736,726

(22) Filed: Apr. 18, 2007

(65) Prior Publication Data

US 2008/0258542 A1    Oct. 23, 2008

(51) Int. Cl.
*B60T 13/00* (2006.01)
(52) U.S. Cl. ............... 303/7; 303/15; 303/123
(58) Field of Classification Search ........... 137/112; 251/30.01
See application file for complete search history.

(56) References Cited

U.S. PATENT DOCUMENTS

| | | | |
|---|---|---|---|
| 3,181,917 A * | 5/1965 | Dobrikin et al. ............... 303/40 |
| 4,018,485 A | 4/1977 | Fannin |
| 4,230,373 A | 10/1980 | Plantan |
| 4,232,908 A | 11/1980 | Stearns |
| 4,261,624 A | 4/1981 | Plantan |
| 4,605,262 A | 8/1986 | Bartholomew |
| 4,657,311 A | 4/1987 | Fannin |
| 4,673,222 A | 6/1987 | Knight |
| 5,042,883 A * | 8/1991 | McCann et al. ............... 303/7 |
| 5,046,786 A | 9/1991 | Johnston et al. |
| 5,226,692 A | 7/1993 | Eberling |
| 5,261,458 A * | 11/1993 | Johnson et al. ............ 137/627.5 |
| 5,409,303 A * | 4/1995 | Engelbert et al. ........ 303/118.1 |
| 5,445,440 A * | 8/1995 | Plantan ............................ 303/7 |
| 5,553,928 A * | 9/1996 | Hart et al. ......................... 303/7 |
| 5,577,814 A * | 11/1996 | Engelbert et al. ........ 303/118.1 |
| 5,666,995 A * | 9/1997 | Herbst et al. ............... 137/627.5 |
| 5,722,740 A * | 3/1998 | Engelbert et al. ........ 303/118.1 |
| 6,247,764 B1 * | 6/2001 | Koelzer ..................... 303/118.1 |
| 6,655,750 B2 | 12/2003 | Soupal |
| 6,729,696 B2 | 5/2004 | Kemer et al. |
| 7,020,551 B2 * | 3/2006 | Goebels et al. ................. 701/38 |
| 7,204,563 B2 | 4/2007 | Soupal |
| 2002/0113486 A1 * | 8/2002 | Marsh et al. ..................... 303/7 |
| 2002/0167219 A1 | 11/2002 | Kemer et al. |
| 2006/0076823 A1 * | 4/2006 | Soupal ............................. 303/7 |

* cited by examiner

*Primary Examiner* — Bradley King
*Assistant Examiner* — Thomas Irvin
(74) *Attorney, Agent, or Firm* — Carlson, Gaskey & Olds, PC (57) ABSTRACT

A tractor protection valve includes a trailer service brake portion, a trailer parking brake portion, and a stability control portion that are each formed within a common valve body. In one example, the trailer service brake portion includes three inlets that can be used to apply a trailer service brake. The three inlets cooperate with a service brake blocking piston, a service brake relay piston, and double check valves to apply the trailer service brakes as needed. The stability control portion includes a solenoid that can direct air to apply the trailer service brakes in response to a stability control signal. The trailer parking brake portion also includes multiple ports that cooperate with a parking brake piston and valve to control application and release of the trailer parking brakes.

28 Claims, 5 Drawing Sheets

FULL FUNCTION TRACTOR PROTECTION VALVE

TECHNICAL FIELD

The subject invention relates to a tractor protection valve with integrated trailer service brake, parking brake, and stability control features.

BACKGROUND OF THE INVENTION

Air brake systems are commonly used for tractor vehicles that tow trailers. Such systems include a tractor protection valve that controls air supply to trailer brakes. The tractor protection valve receives an air signal from a park brake control valve that is typically mounted to a dash in the tractor. The air signal from the park brake control valve can be used to apply or release trailer spring brakes, sometimes referred to as parking or emergency brakes, and can be used to charge or re-supply trailer reservoirs, which typically comprise primary and secondary air sources. The tractor protection valve also receives air signals from a service brake foot valve or trailer hand control valve to apply or release trailer service brakes. Some tractor protection valves include check valves that blend air from the primary, secondary, and hand control air sources that are used to apply the trailer service brakes.

If there is insufficient air pressure in the parking brake or re-supply portion of the tractor protection valve, the tractor protection valve is configured to prevent air from being delivered through the service brake portion. This prevents compounding of the trailer spring brakes and protects a tractor air supply by blocking a loss of air pressure out of a service control line in the event that a connection line between the tractor and trailer is inadvertently disconnected. Compounding refers to the undesirable condition where parking and service brakes are applied simultaneously.

One disadvantage with current configurations is the amount of time it takes to apply and release trailer parking brakes. If a line from a park brake control port to a supply port of the tractor protection valve is long, or if it is somehow otherwise restricted due to routing through a tractor undercarriage, park brake apply and release times are adversely affected. Likewise, if service brakes lines to the tractor protection valve are long or restricted, then service brake apply and release times are adversely affected.

Further, some brake systems use a stability or roll-control sensor to apply trailer brakes without driver intervention in response to a sensed stability event. A solenoid valve assembly can be connected to the tractor protection valve to accomplish this function. These additional connection lines increase system costs.

Thus, there is a need for a tractor protection valve configuration that provides faster apply and release times for trailer service and parking brakes, and which reduces costs by eliminating the number of air connections to separate components.

SUMMARY OF THE INVENTION

A tractor protection valve includes a trailer parking brake portion that controls application and release of a trailer parking brake system, a trailer service brake portion that controls application and release of a trailer service brake system, and a stability control portion that controls application of a trailer service brake in response to a stability control signal. To reduce the number of supply connections and to provide faster release and apply times, the trailer parking brake portion, the trailer service brake portion, and the stability control portion are consolidated within a common valve body.

In one disclosed example, the trailer parking brake portion includes a first inlet port to receive air from a primary air source, a second inlet port to receive air from a secondary air source, and a double check valve that operates between the first and second inlet ports. A parking brake piston is located within a piston cavity and a parking brake valve disc is associated with the parking brake piston. Air is supplied via the double check valve through the parking brake valve disc and exits via an outlet port to release trailer parking brakes. Additionally, the parking brake valve disc can supply air to re-fill the primary and secondary air sources via another outlet port. The parking brake piston is actuated in response to an air signal from a parking brake control valve that is mounted to a vehicle dash, for example.

In one disclosed example, the trailer service brake portion includes a first inlet port to receive air from the primary air source, a second inlet port to receive air from the secondary air source, a third inlet port that receives an air signal from a hand control device to be actuated by a user. A first double check valve operates between the second and third inlet ports, and a second double check valve operates between an output from the first double check valve and the first inlet port. A service brake blocking piston is in fluid communication with an output from the second double check valve. The service brake blocking piston prevents compounding, which is the undesirable condition where parking and service brakes are applied simultaneously. A service brake relay piston receives a pressure signal from the second double check valve when the service brake blocking piston is in a non-blocking position. The service brake relay piston cooperates with a service brake valve disc to supply air to the trailer service brake system via an outlet port.

In one disclosed example, the service brake relay piston includes an orifice that extends through a piston body from one piston face to an opposite piston face. The orifice creates a pressure drop across the service brake relay piston that forces the service brake relay piston down, opens the service brake valve disc, and permits air to be supplied to apply the trailer service brakes. The orifice eliminates crack pressure normally found in relay devices.

In one disclosed example, the stability control portion includes a solenoid valve mounted within the common valve body. The solenoid valve provides a first condition where air is allowed to pass through the solenoid valve to cooperate with the service brake relay piston to apply the trailer service brake system in response to a stability control signal. The stability control signal usually indicates an unstable condition of the tractor or trailer that is sensed by a vehicle sensor. The solenoid valve provides a second condition where the solenoid valve blocks air from being supplied to the trailer service brake system and allows supply air to be exhausted via an exhaust port.

By integrating the above-specified features into a common tractor protection valve body, faster apply and release times are provided for both trailer service and parking brakes, while additional crack pressure is prevented. Further, trailer service brakes are efficiently applied in response to stability or rollover events. Integration also provides a safer configuration because the number of exposed plumbing lines is significantly reduced. Also installation and component costs are reduced because fewer components are required to be installed within the vehicle and fewer air connection lines are required to be routed throughout the vehicle.

These and other features of the present invention can be best understood from the following specification and drawings, the following of which is a brief description.

DETAILED DESCRIPTION OF THE PREFERRED EMBODIMENT

Figure 1:
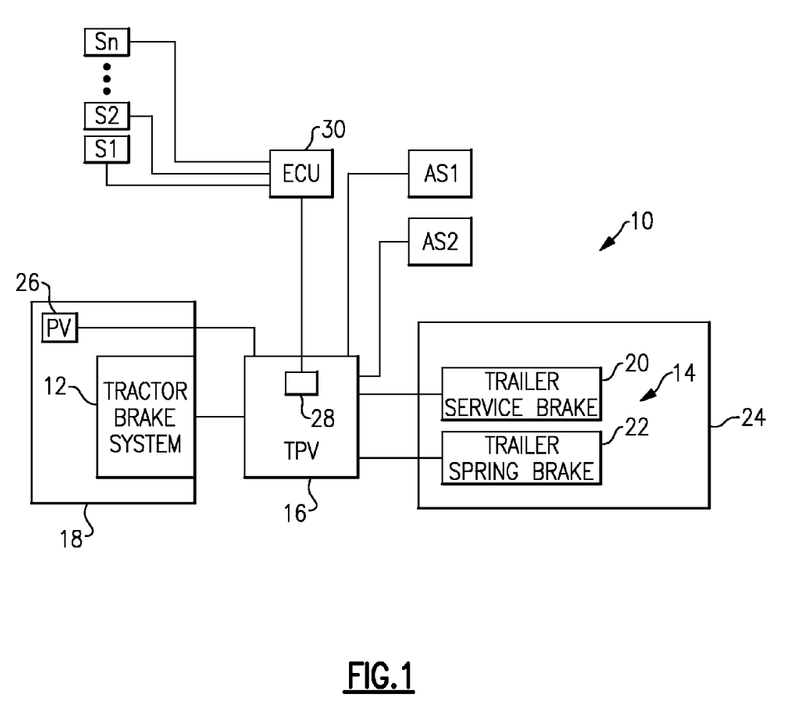
FIG. 1 is a schematic view of tractor trailer braking system having a tractor protection valve incorporating the subject invention.

A schematic tractor and trailer air brake system is shown generally at 10 in FIG. 1. The tractor and trailer air brake system includes a tractor brake system 12 and a trailer brake system 14. The tractor brake system 12 includes tractor service braking and parking braking and the trailer brake system 14 includes trailer service braking and parking braking. A tractor protection valve 16, typically located in the tractor 18 controls air supply to trailer service brakes 20 and trailer parking brakes 22 in the trailer 24.

The tractor protection valve 16 receives an air signal from a park brake control valve 26 that is typically mounted to a dash in the tractor 18. The air signal from the park brake control valve 26 can be used to apply or release the trailer parking brakes 22, which are sometimes referred to as spring brakes or emergency brakes. The air signal from the park brake control valve 26 can also be used to control the charge or re-supply of trailer reservoirs. If there is insufficient air pressure from the parking brake valve or re-supply portion of the tractor protection valve 16, the tractor protection valve 16 is configured to prevent air from being delivered through a service brake portion. This prevents compounding of the trailer parking brakes 22 and protects a tractor air supply by blocking a loss of air pressure out of a service control line in the event that a connection line between the tractor 18 and trailer 24 is inadvertently disconnected. Compounding refers to the undesirable condition where parking and service brakes are applied simultaneously.

The tractor protection valve 16, shown schematically in FIG. 1, also includes a stability control mechanism 28 that is controlled via an electronic control unit 30 (ECU). The ECU 30 can be a separate controller used only for the tractor protection valve or can be part of any other vehicle controller. At least one sensor S1, S2, . . . Sn senses various vehicle operating conditions, such as wheel speed, acceleration, roll-over, etc., that are communicated to the ECU 30. The ECU 30 then determines whether conditions indicate a potential for a stability event, such as a potential roll-over event for example, and sends a control signal to the stability control mechanism 28 to actuate brakes as needed to correct any unstable conditions. This will be discussed in greater detail below.

The tractor protection valve 16 is shown in greater detail in FIGS. 2-5. The tractor protection valve 16 includes a valve body 40 having a trailer service brake portion 42, a trailer parking brake portion 44, and a stability control portion 46. Thus, the valve body 40 comprises a single valve body that incorporates multiple features to reduce the overall number of system components and air line connections.

The valve body 40 includes a primary service brake inlet port 48 that receives input from a service brake foot valve that is supplied by a primary air source AS1 and a secondary service brake inlet port 50 that receives input from a service brake foot valve that is supplied by a secondary air source AS2. A third input comprises a hand control input port 52 that receives an air signal from a hand control (not shown) which is typically mounted on a dash in the tractor 18. A first double check valve 54 is mounted within a first valve cavity 56 of the valve body 40 and a second double check valve 58 is mounted within a second valve cavity 60 of the valve body 40. The first double check valve 54 reacts to the higher air pressure signal from the secondary service brake inlet 50 or the hand control input port 52 as an output 62 to the second double check valve 58.

The second double check valve 58 reacts to the higher air pressure signal from the output 62 of the first double check valve 54 and the primary service brake inlet port 48. The second double check valve 58 has an output 64 to a service brake blocking piston assembly 66. The service brake blocking piston assembly 66 includes a piston shaft 68 that supports a blocking valve disc 70 and a service brake blocking piston 72. The blocking valve disc 70 is located within a first cavity 74 and includes a spring 76 that biases the blocking valve disc 70 to maintain contact with blocking piston 72. The service brake blocking piston 72 is located within a second cavity 78 and includes another spring 80. An outlet passage 82 is positioned to communicate air from the first cavity 74 to a third double check valve 84 that is located within a third cavity 86 formed within the valve body 40. The spring 80 biases the service brake blocking piston 72 and blocking valve disc 70 to close off the outlet passage 82. A vent 88 allows air to be vented from the second cavity 78 as needed. The service brake blocking piston 72 can be actuated by an input signal from the stability control mechanism 28 via an input passage 90. This will be discussed in greater detail below.

The stability control mechanism 28 includes a solenoid 92 that is mounted within a cavity 94 formed within the valve body 40. The solenoid 92 controls fluid connection to a first passage 95 that is in communication with the third double check valve 84 and connection to a second passage 96 that is in communication with input passage 90 to the service brake blocking piston assembly 66. The third double check valve 84 reacts to the higher pressure between the first passage 95 and outlet passage 82 from the service brake blocking piston assembly 66. The third double check valve 84 will provide the higher pressure via an outlet 98 to a cavity 100 that houses a service brake relay piston 102.

The service brake relay piston 102 is supported on a piston shaft 104 and is associated with a service brake valve disc 106 that is fixed to a shaft 108. A first spring 110 reacts with an end of the piston shaft 104 and a second spring 112 reacts against the service brake valve disc 106. The service brake valve disc 106 is housed within a cavity 114 that is fluidly connectable to cavity 175 via a passage 116.

A parking brake piston 118 is located within another cavity 120 formed within the valve body 40 and is mounted to a piston shaft 122. A parking brake valve disc 124 is associated with the parking brake piston 118 and is mounted to shaft 126. A first spring 128 reacts against the parking brake piston 118 and a second spring 130 reacts against the parking brake valve disc 124. The parking brake valve disc 124 is housed within a cavity 132 that is fluidly connectable to cavity 176 via a passage 134.

In the example shown, the service brake valve disc 106, the shaft 108, the parking brake piston 118, shaft 122, parking brake valve disc 124, and shaft 126 are all aligned with each other for movement along a common linear path. These components also all cooperate with each other to form an exhaust passage 136 that is defined within hollow aligned bores formed within the service brake valve disc 106, the shaft 108, the parking brake piston 118, shaft 122, parking brake valve disc 124, and shaft 126. The exhaust passage 136 allows air to be exhausted from the valve body 40 via an outlet port 140.

The cavity 100 that includes the service brake relay piston 102 includes a delivery port 142 to the trailer service brakes 20. The cavity 114 that includes the service brake valve disc 106 is in fluid communication with the cavity 120 that includes the parking brake piston 118 via a passage 144. Passage 144 communicates with the stability control mechanism 28 via passage 146 and communicates with the cavity 176 via passage 148.

Input from the park brake control valve 26 is received via inlet port 150 which is in communication with cavity 120 that includes the parking brake piston 118. The inlet port 150 exerts pressure on one side 152 of the parking brake piston 118. On an opposite piston side 154, the cavity 120 includes a first outlet port 156 to supply air to the trailer and a second outlet port 158 to supply air to the trailer. The second outlet port 158 is fluidly connected to passage 148.

The parking brake piston 118, the parking brake valve disc 124 and the associated springs 128, 130 and shafts 122, 126 are located within the parking brake portion 44 of the valve body 40. This parking brake portion 44 includes a first inlet port 160 from a primary air supply AS1 and a second inlet port 162 from a secondary air supply AS2. A fourth double check valve 164 is mounted within a cavity 166 formed within the valve body 140 and supplies the higher pressure signal from the inlet ports 160, 162 to an outlet passage 168 that is in fluid communication with the cavity 132 that houses the parking brake valve disc 124.

The subject tractor protection valve 16 is configured to operate more efficiently than prior systems and provides faster apply and release times for both service and parking brake systems for the trailer. Traditional tractor protection valves are slow to supply or exhaust air from the parking brakes because the air must pass from an air supply reservoir, to the park brake control valve, then to the tractor protection valve, and then on to the trailer. To exhaust the air from the parking brakes, i.e. to apply the trailer parking/spring brakes, the air must travel from the trailer, through the tractor protection valve, and exit at the parking brake control valve exhaust port.

The present tractor protection valve 16 improves supply/exhaust times by providing for connections of the primary and secondary supply air directly from the reservoirs themselves. The long passage through the vehicle from the park brake control valve 26 to the tractor protection valve 16 becomes a control line only, and thus pressure is delivered quickly. Further, the present tractor protection valve includes an exhaust passage 136 that allows air to be exhausted at the tractor protection valve itself rather than being passed back to the park brake control valve for exhausting.

The tractor protection valve 16 operates in the manner described below. The parking braking, i.e. the supply/emergency, portion 44 of the tractor protection valve 16 includes multiple exterior ports as described above. Double check valve 164, referred to as parking check valve, acts to supply the higher pressure from primary and secondary air inputs to the cavity 132 that houses the parking brake valve disc 124 (see FIG. 2, which shows trailer service brakes applied and trailer parking brakes released). When the park brake control valve 26 is activated, air is delivered to the inlet port 150 which exerts pressure against the parking brake piston 118. This force causes the parking brake piston 118 to engage and open the parking brake valve disc 124. This supplies air pressure from the primary and/or secondary air reservoirs to be delivered to the trailer to release the parking/spring brakes 22 and fill the trailer reservoirs. If the park brake control valve 26 is activated to a trailer spring brake apply position, then the port 150 is exhausted to the park brake control valve 26 and the parking brake piston 118 moves away from the parking brake valve disc 124 and air to the delivery area is exhausted such that the trailer is parked (see FIG. 3, which shows trailer parked and service brakes blocked).

Figure 2:
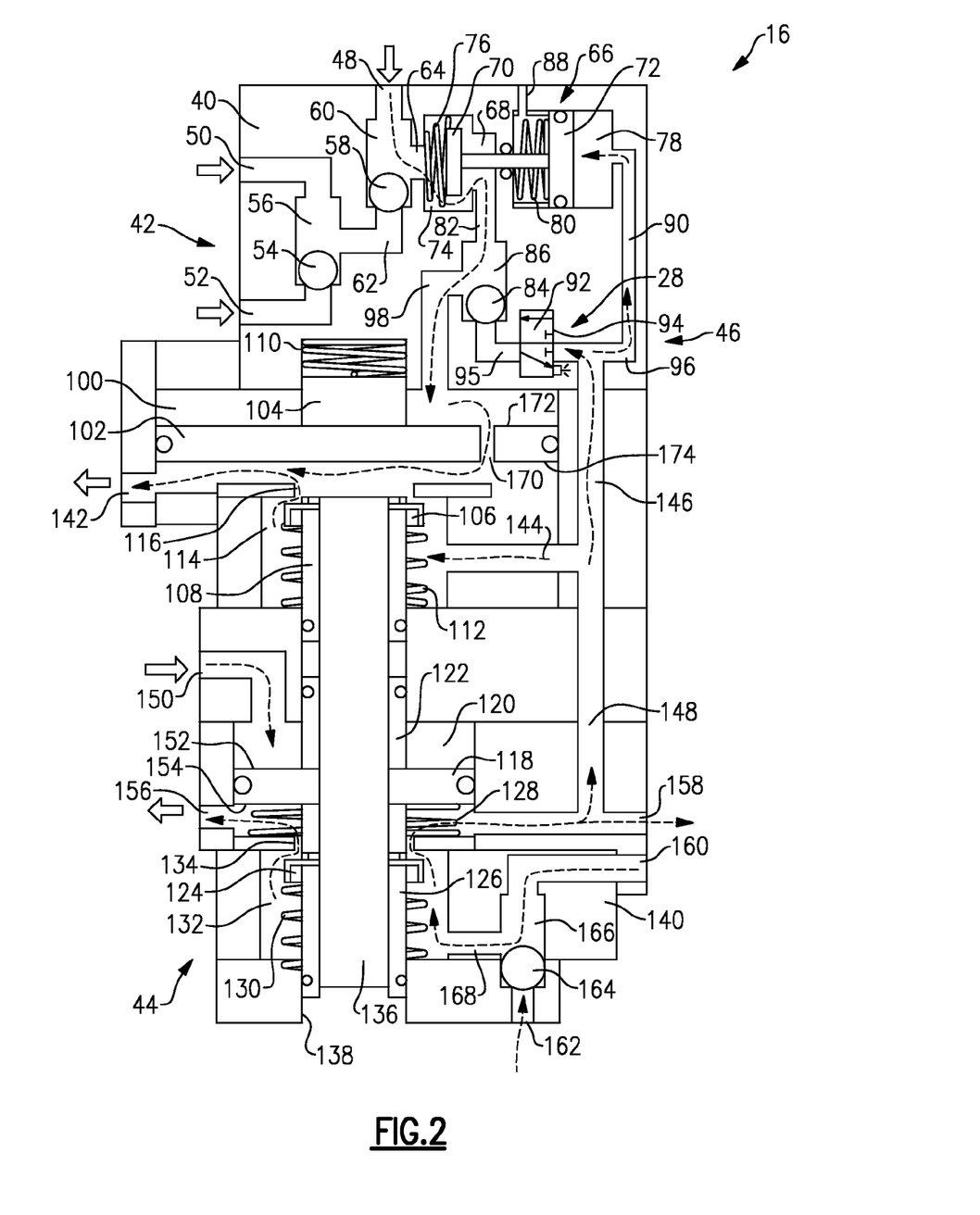
FIG. 2 is a schematic view of the tractor protection valve in a trailer service brake applied and a trailer spring brake released condition.

Also, as shown in FIG. 2, the primary/secondary supply inlet ports 160, 162 supply air to the solenoid 92 of the stability control mechanism 28 via cavities 132, 176, and passages 158, 148, 146, and 96. This eliminates a separate supply line that is required in a traditional tractor protection valve configuration. The primary/secondary supply inlet ports 160, 162 also supply air to the service brake blocking piston assembly 66 via cavities 132, 176 and passages 158, 148, 146, 96, and 90. This eliminates another separate supply line used in traditional configurations.

As discussed above, FIG. 3 shows a configuration where the trailer is parked and service brakes are blocked. Sensors S1-Sn in the vehicle could indicate that air pressure is required in the trailer to apply or release the trailer service brakes 20 in response to a stability control event. The solenoid 92 is actuated to accomplish this task and air pressure is allowed to pass through the solenoid valve 92 and into the double check valve 84 and then onto the service brake relay piston 102 as shown in FIG. 4. FIG. 4 thus shows a configuration where the trailer stability mechanism has been applied and the trailer parking brakes are released.

Figure 3:
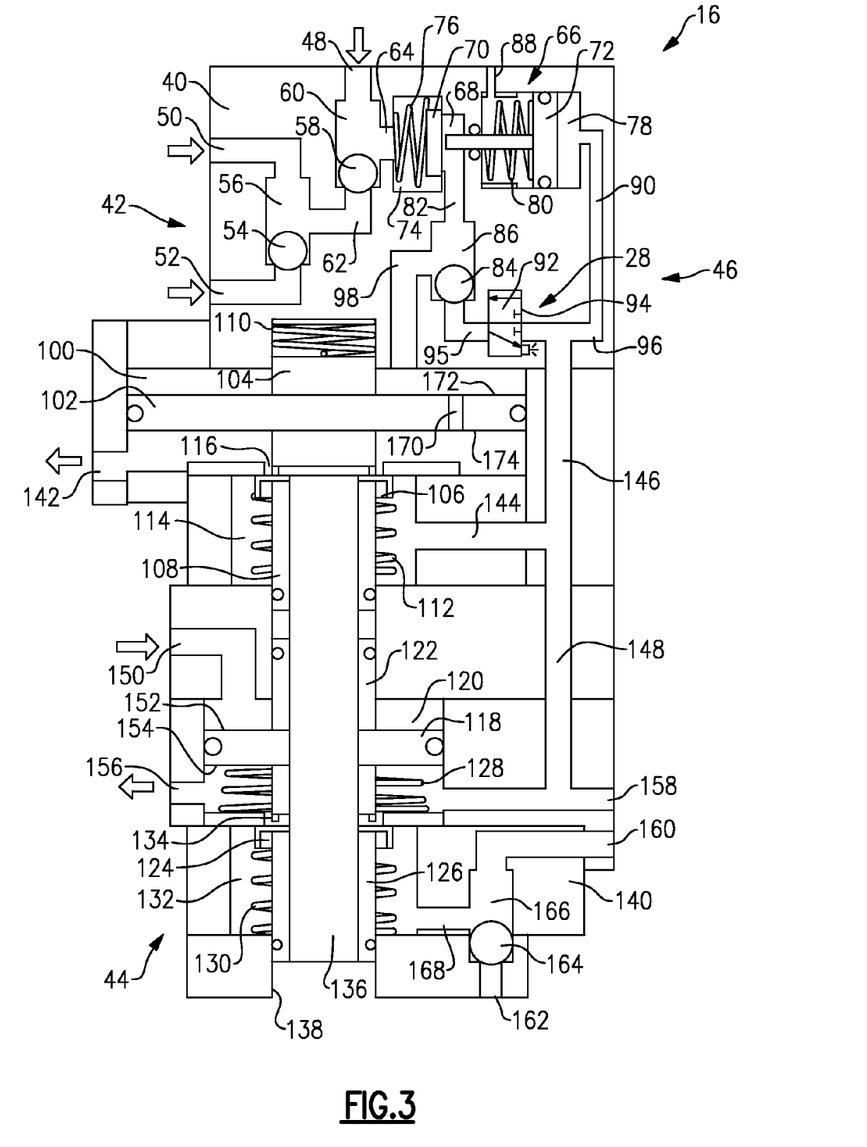
FIG. 3 is a schematic view of the tractor protection valve in a trailer parked and service brakes blocked condition.
Figure 4:
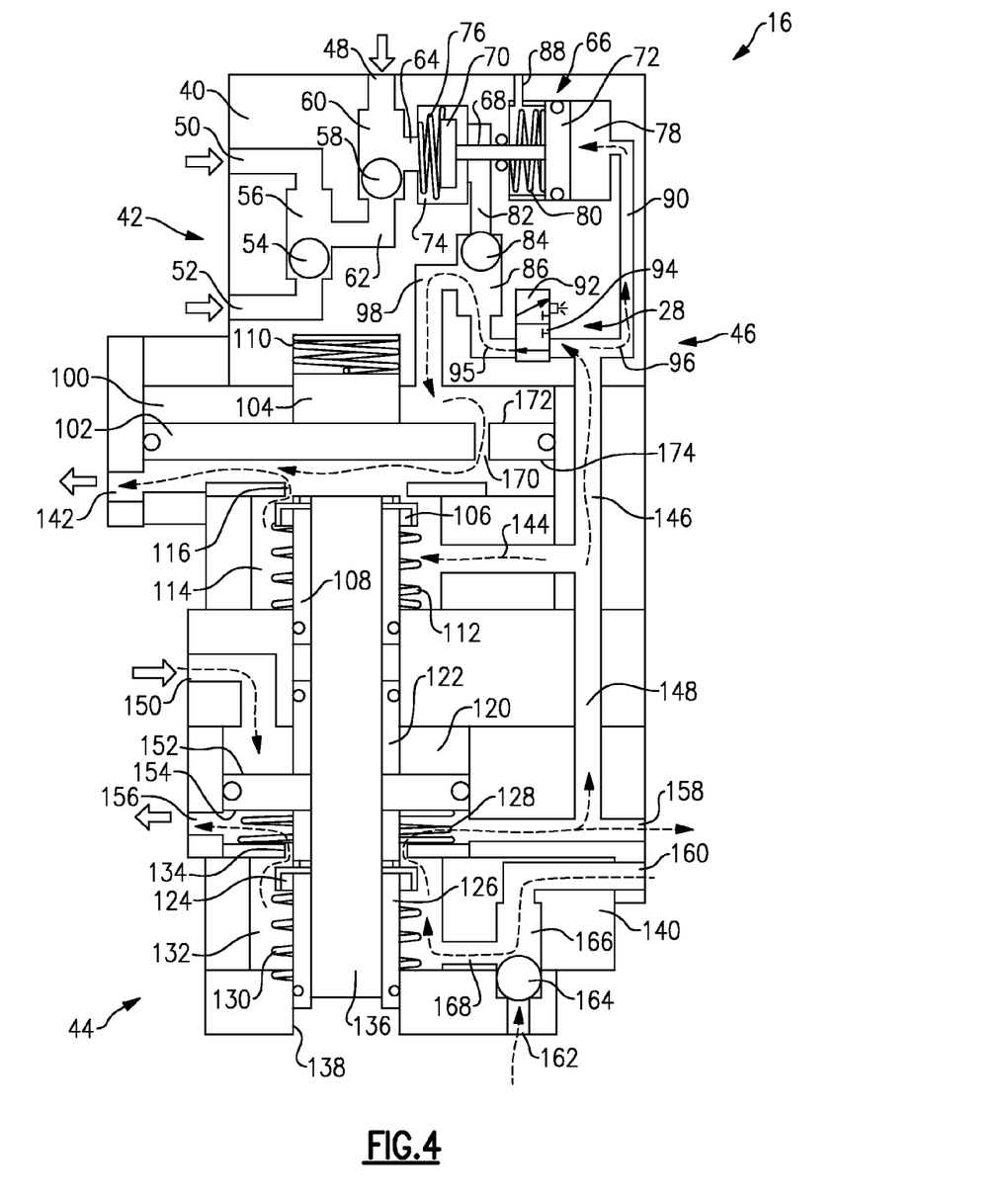
FIG. 4 is a schematic view of the tractor protection valve in a trailer stability application with trailer spring brakes released condition.

In the non-applied position, FIG. 3, the solenoid 92 will block the air supply and exhaust the delivered air. By integrating the stability control solenoid 92 into the valve body 40 of the tractor protection valve 16, separate supply and delivery lines, which are normally required, are eliminated.

Current tractor protection valve configurations use air that is delivered from a foot operated valve to the tractor protection valve and then to the trailer. The long delivery line that is routed between the foot operated valve and the tractor protection valve can result in slow brake apply times to the trailer. Existing tractor protection valves can include an integrated or separate quick delivery release valve to quickly exhaust service brake air pressure. Instead of using this traditional configuration, the present tractor protection valve uses three different service brake ports comprising a trailer hand control valve port, and primary and secondary foot valve delivery line ports associated with primary and secondary air sources. All three ports can be used to apply and release the trailer service brakes 20. Air enters the valve body 40 through double check valves that each provide protection from loss of air pressure in case of failure at another check valve.

Figure 5:
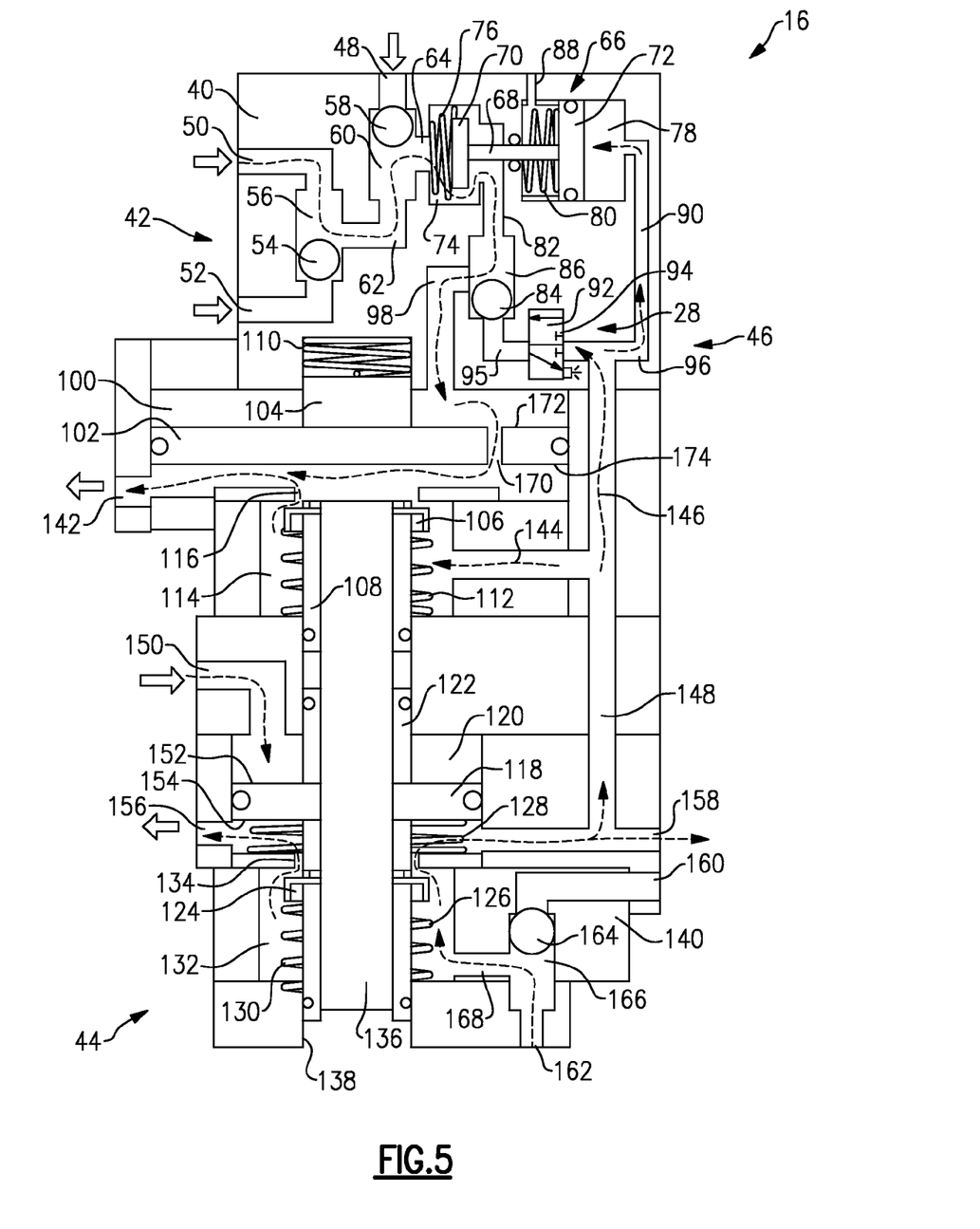
FIG. 5 is a schematic view of a primary fail, secondary applied, and trailer spring brake released condition.

As shown in FIG. 2, air may enter the primary service brake inlet port 48, pass through the second double check valve 58 and into the cavity 74 that houses the blocking valve disc. If supply pressure is present behind the service brake blocking piston 72 then primary air passes through the blocking valve disc 70 and into the third double check valve 84, which is associated with the stability control mechanism 28, and then subsequently into cavity 100 to exert pressure against the service brake relay piston 102. The service brake relay piston 102 can also be referred to as a control relay piston for the trailer service brake system. FIG. 5 shows a valve configuration similar to that of FIG. 2 but shows air entering via the secondary inlet ports 50, and secondary supply port 162 due to a failure at the primary air source.

In order to eliminate any crack pressure in the control relay, the primary air may pass through an orifice 170 formed within the service brake relay piston 102. The orifice 170 is a passage that extends through a piston body from one piston side 172 to an opposite piston side 174. The orifice 170 is sized such that it will also create a pressure drop across the service brake relay piston 102 that will force the service brake relay piston 102 down, open the service brake valve disc 106, and permit primary supply pressure to be sent to the trailer delivery port 142 to apply the trailer service brakes 20.

The orifice 170 in the service brake relay piston 102 eliminates the crack pressure normally found in relay devices. However, if the vehicle is parked, then this passage can cause compounding, which is the undesirable condition where service and parking brakes are applied simultaneously. In the situation of a trailer breakaway, the orifice 170 could allow service brake air to be exhausted out the trailer service brake delivery port 142. Both of these undesirable conditions are prevented by the service brake blocking piston assembly 66. If the vehicle is parked then there is no pressure in the primary supply line, see FIG. 3. In this case, the blocking piston spring 80 overcomes the service brake blocking piston 72, and the blocking valve disc 70 is allowed to close the service brake air flow path at passage 82.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A tractor protection valve comprising:
   a trailer parking brake portion that controls application and release of a trailer parking brake system;
   a trailer service brake portion that controls application and release of a trailer service brake system;
   a stability control portion that controls application of a trailer service brake in response to a stability control signal, wherein said trailer parking brake portion, said trailer service brake portion, and said stability control portion are each formed within a common valve body;
   a service brake relay piston, a service brake valve disc associated with said service brake relay piston, a parking brake piston, and a parking brake valve disc associated within said parking brake piston wherein said service brake relay piston, said service brake valve disc, said parking brake piston, and said parking brake valve disc are all movable along a common linear path; and
   wherein said trailer parking brake portion and said trailer service brake portion are exhausted from said common valve body via a single exhaust passage that extends through said parking brake and service brake valve discs.

2. The tractor protection valve according to claim 1 wherein said stability control portion comprises a solenoid valve positioned within an enclosed internal cavity formed within said common valve body, said solenoid valve providing a first condition where air is allowed to pass through said solenoid valve to cooperate with the service brake relay piston to supply air via an outlet port to apply the trailer service brake in response to the stability control signal, and a second condition where the solenoid valve blocks air from being supplied to said outlet port and allows supplied air to be exhausted via an exhaust port.

3. The tractor protection valve according to claim 2 wherein said stability control signal indicates at least one of a tractor and trailer roll-over instability condition that is sensed by a sensor.

4. The tractor protection valve according to claim 1 wherein the service brake relay piston is movable to a service brake apply position in response to air supplied via at least one service brake inlet port.

5. The tractor protection valve according to claim 4 including a service brake blocking piston cooperating with said at least one service brake inlet port to prevent simultaneous application of the trailer service brake system and the trailer parking brake system.

6. The tractor protection valve according to claim 5 wherein said at least one service brake inlet port comprises a first inlet port to receive a pressure signal from a primary air source, a second inlet port to receive a pressure signal from a secondary air source, and a third inlet port to receive a pressure signal from a hand control device to be actuated by a user, and including a first double check valve having a pair of first double check valve inlets formed within said common valve body and in fluid communication with said second and third inlet ports, respectively, and having a first double check valve outlet, and a second double check valve having a pair of second double check valve inlets formed within said common valve body and in fluid communication with said first double check valve outlet and said first inlet port, respectively, and a second double check valve outlet that is in fluid communication with said service brake blocking piston.

7. The tractor protection valve according to claim 4 wherein said service brake relay piston includes an orifice extending between opposed piston surfaces allowing air to flow from said at least one service brake inlet port, through said service brake relay piston, and into a service brake outlet port.

8. The tractor protection valve according to claim 1 wherein said trailer parking brake portion includes the parking brake piston that is located within said common valve body and first and second inlet ports to be directly connectable to primary and secondary air reservoirs, respectively, and an outlet port to be in fluid communication with a trailer park brake.

9. The tractor protection valve according to claim 8 including a trailer parking brake control valve disc that cooperates with said parking brake piston to supply air to said outlet port for the trailer park brake and to another outlet port that is connectable to supply air to the primary and secondary air reservoirs.

10. The tractor protection valve according to claim 1 wherein said valve body is adapted to be mounted within a tractor.

11. The tractor protection valve according to claim 10 wherein:
   said trailer parking brake portion includes a primary air supply port directly connected to a primary air source, a second air supply port directly connected to a secondary air source, a park brake control valve port, and an outlet port to deliver air to a trailer;
   said trailer service brake portion includes three different service brake ports comprising a trailer hand control valve port, a primary foot valve delivery line port, and a secondary foot valve delivery line port, and wherein all three service brake ports can be used to apply and release trailer service brakes; and
   said stability control portion is configured to direct primary air pressure to a service brake relay piston when in an applied condition and to block primary air supply and exhaust delivered air pressure in a non-applied condition.

12. The tractor protection valve according claim 11 wherein said trailer service brake portion includes a service brake blocking piston assembly that is configured to block a service brake air flow path, and wherein the service brake blocking piston assembly includes at least a spring and a service brake blocking piston such that when there is no air pressure in a supply line said spring is biased to move said service brake blocking piston to a closed position to provide an anti-compounding function.

13. The tractor protection valve according to claim 1 wherein said trailer parking brake portion includes separate primary and secondary air supply inlet ports that are fluidly connectable to supply air to said stability control portion via a stability control passage and wherein said primary and secondary air supply inlet ports are also fluidly connectable to said trailer service brake portion to supply air to a service brake blocking piston assembly said stability control passage.

14. The tractor protection valve according to claim 1 wherein the tractor protection valve is configured to protect a tractor air supply by blocking a loss of air pressure out of a service control line when a connection line between a tractor and trailer is disconnected.

15. A tractor protection valve comprising:
a trailer parking brake portion that controls application and release of a trailer parking brake system;
a trailer service brake portion that controls application and release of a trailer service brake system;
a stability control portion that controls application of a trailer service brake in response to a stability control signal wherein said trailer parking brake portion, said trailer service brake portion, and said stability control portion are each formed within a common valve body;
wherein said trailer parking brake portion includes a first inlet port to receive air from a primary air source, a second inlet port to receive air from a secondary air source, a first double check valve located within said common valve body to operate between said first and second inlet ports, a parking brake piston located within a first piston cavity, a parking brake valve disc associated with said parking brake piston, a first outlet port to supply air to release the trailer parking brake system, and a second output port to supply air to re-fill the primary and secondary air sources;
wherein said trailer service brake portion includes a third inlet port to receive air from the primary air source, a fourth inlet port to receive air from the secondary air source, a fifth inlet port to receive an air signal from a hand control device to be actuated by a user, a second double check valve located within said common valve body to operate between said fourth and fifth inlet ports, a third double check valve located within said common valve body to operate between an output from said second double check valve and said third inlet port, a service brake blocking piston in fluid communication with an output from said third double check valve, a service brake relay piston in fluid communication with an output from said service brake blocking piston, a service brake valve disc associated with said service brake relay piston, and a third output port to supply air to the trailer service brake system;
wherein said stability control portion includes a solenoid valve mounted within said common valve body, said solenoid valve providing a first condition where air is allowed to pass through said solenoid valve to cooperate with said service brake relay piston to supply air via said third outlet port to apply the trailer service brake system in response to the stability control signal, and a second condition where the solenoid valve blocks air from being supplied to said third outlet port and allows supplied air to be exhausted via an exhaust port; and
a fourth double check valve that that has a pair of fourth double check valve inputs that receive air from the output from said service brake blocking piston and the solenoid valve, respectively, and a fourth double check valve output that supplies air to actuate said service brake relay piston.

16. The tractor protection valve according to claim 15 wherein said trailer parking brake portion and said trailer service brake portion are exhausted from said common valve body via said exhaust port.

17. The tractor protection valve according to claim 16 wherein said exhaust port comprises a passage that extends through said service brake valve disc, said parking brake piston, and said parking brake valve disc.

18. The tractor protection valve according to claim 15 wherein said valve body is adapted to be mounted within a tractor, and wherein said stability control portion comprises a control mechanism that is responsive to a stability control roll-over signal, and wherein said control mechanism includes a solenoid valve positioned within an enclosed internal cavity formed within said common valve body.

19. The tractor protection valve according to claim 15 wherein said first inlet port is directly connected to said primary air source and said second inlet port is directly connected to said secondary air source, and wherein said trailer parking brake portion includes an exhaust port that allows air to be exhausted directly from the tractor protection valve without passing through a separate park brake control valve.

20. The tractor protection valve according to claim 15 wherein the tractor protection valve is configured protect a tractor from loss of pressure by blocking air supply to a trailer when there is insufficient air pressure in an inlet control port from a dash valve thereby blocking air supply to the trailer by blocking said first and said second outlet ports via said parking brake valve disc.

21. A tractor protection valve comprising;
a trailer parking brake portion that controls application and release of a trailer parking brake system, said trailer parking brake portion including a parking brake control valve disc that cooperates with a parking brake piston movable to an air delivery position in response to air supplied from a tractor park brake dash valve, said parking brake control valve disc, in cooperation with the said parking brake piston, supplies air to an outlet port, said outlet port in fluid communication with the trailer parking brake system;
a trailer service brake portion that controls application and release of a trailer service brake system, said trailer service brake portion responds to air pressure from a tractor service brake foot valve; said trailer service brake portion responding to the service brake foot valve, and pressurized air from the tractor park brake dash valve allows a tractor service brake system to communicate with the trailer service brake system;
said trailer parking brake portion and said trailer service brake portion are each formed in a common body;
a service brake relay piston and a service brake valve disc associated with said service brake relay piston, and wherein said service brake relay piston, said service brake valve disc, said parking brake piston, and said parking brake control valve disc are all movable along a common linear path; and wherein said trailer parking brake portion and said trailer service brake portion are exhausted from said common valve body via a single exhaust passage that extends through said parking brake control valve disc and said service brake valve disc.

22. The tractor protection valve according to claim 21 wherein said common body is adapted to be mounted within a tractor, and wherein said stability control portion comprises a control mechanism that is responsive to a stability control roll-over signal, and wherein said control mechanism includes a solenoid valve positioned within an enclosed internal cavity formed within said common valve body.

23. The tractor protection valve according to claim 21 wherein said trailer parking brake portion includes a first inlet port that is directly connected to a primary air source and a second inlet port that is directly connected to a secondary air source, and wherein said trailer parking brake portion includes a park brake control valve inlet port fluidly connected to said tractor park brake dash valve, and wherein said trailer parking brake portion includes an exhaust port that allows air to be exhausted directly from the tractor protection valve without passing through a separate park brake control valve.

24. The tractor protection valve according to claim 21 wherein the tractor protection valve is configured to protect a tractor air supply by blocking a loss of air pressure out of outlet ports from the trailer parking and service brake portions when a connection line between a tractor and trailer is disconnected.

25. A tractor protection valve comprising;
a trailer parking brake portion that controls application and release of a trailer parking brake system, said trailer parking brake portion including a parking brake control valve disc that cooperates with a parking brake piston movable to an air delivery position in response to air supplied from a tractor park brake dash valve, said parking brake control valve disc, in cooperation with the said parking brake piston, supplies air to an outlet port, said outlet port in fluid communication with the trailer parking brake system;
a service brake blocking piston cooperating with at least one service brake inlet port and in response to air delivery from the trailer parking brake portion prevents simultaneous application of the trailer service brake system and the trailer parking brake system;
a trailer service brake portion that controls application and release of the trailer service brake system which includes a service brake control valve disc, that cooperates with a service brake piston movable to a service brake apply position in response to air supplied via said at least one service brake inlet port, a service brake relay piston including an orifice extending between opposed piston surfaces for allowing air to flow from said at least one service brake inlet port through said service brake relay piston and into a service brake outlet port, the service brake piston in fluid communication with an output from the service brake blocking piston;
said trailer parking brake portion, said trailer service brake portion and said service brake blocking piston are each formed in a common body;
wherein said service brake relay piston, said service brake control valve disc, said parking brake piston, and said parking brake control valve disc are all movable along a common linear path; and
wherein said trailer parking brake portion and said trailer service brake portion are exhausted from said common valve body via a single exhaust passage that extends through said parking brake control valve disc and said service brake control valve disc.

26. The tractor protection valve according to claim 25 including a stability control portion formed within said common body, and wherein said common body is adapted to be mounted within a tractor, and wherein said stability control portion comprises a control mechanism that is responsive to a stability control roll-over signal to control application of a trailer service brake, and wherein said control mechanism includes a solenoid valve positioned within an enclosed internal cavity formed within said common valve body.

27. The tractor protection valve according to claim 25 wherein said trailer parking brake portion includes a first inlet port that is directly connected to a primary air source and a second inlet port that is directly connected to a secondary air source, and wherein said trailer parking brake portion includes a park brake control valve inlet port fluidly connected to said tractor park brake dash valve, and wherein said trailer parking brake portion includes an exhaust port that allows air to be exhausted directly from the tractor protection valve without passing through a separate park brake control valve.

28. The tractor protection valve according to claim 25 wherein the tractor protection valve is configured to protect a tractor air supply by blocking a loss of air pressure out of the outlet port of the trailer parking brake portion and out of the service brake outlet port when a connection line between a tractor and trailer is disconnected.

* * * * *